United States Patent [19]

Winkler et al.

[11] Patent Number: 5,799,751

[45] Date of Patent: Sep. 1, 1998

[54] MACHINE TOOL WITH A PLURALITY OF LUBRICATION POINTS

[75] Inventors: Hans Henning Winkler, Tuttlingen; Karl Deufel, Kolbingen, both of Germany

[73] Assignee: Chiron-Werke GmbH & Co. KG, Tuttlingen, Germany

[21] Appl. No.: 803,333

[22] Filed: Feb. 21, 1997

[30] Foreign Application Priority Data

Mar. 1, 1996 [DE] Germany .................. 196 87 783.4

[51] Int. Cl.⁶ .................................... F16N 27/00
[52] U.S. Cl. ................ 184/6.14; 184/6.1; 184/7.4; 184/105.1; 184/105.3
[58] Field of Search .................. 104/6.1, 6.4, 6.14, 104/7.4, 105.1, 105.2, 105.3, 108; 141/234, 236, 382, 383, 386

[56] References Cited

U.S. PATENT DOCUMENTS

| | | | |
|---|---|---|---|
| 2,283,638 | 5/1942 | Klein et al. | 184/7.4 |
| 2,410,480 | 11/1946 | Davis | 184/105.3 |
| 3,678,631 | 7/1972 | Payne et al. | |
| 3,707,203 | 12/1972 | Roberts | 184/7.4 |

OTHER PUBLICATIONS

DE–Z maschine+werkzeug, Coburg, Jul. 1979, "Zentralschmierung—aber wie?", pp. 21–24.

DE–Z Maschinenmarkt, Würzburg, Oct. 1987, P. Reinhold Huber, "Ölaskese Minimaldosierung an Reibstellen mittels automatischer Zentralschmierung sekt Wärme-Verlustleistung", pp. 206–212.

Karl–Heinz Decker, "Maschinenelemente: Gestaltung und berechnung", 1985, Hanser, München, seihe sog, Staufferbuchse, pp. 289 and 290.

Primary Examiner—Christopher Verdier
Attorney, Agent, or Firm—Cummings & Lockwood

[57] ABSTRACT

A machine tool has a plurality of lubrication points to which lubricant must be delivered at specific maintenance intervals. At least some of the lubrication points are connected, via a system of lubricant lines, to a central delivery station for lubricant.

9 Claims, 2 Drawing Sheets

MACHINE TOOL WITH A PLURALITY OF LUBRICATION POINTS

BACKGROUND OF THE INVENTION

1. Field of the Invention

The present invention relates to a machine tool with a plurality of lubrication points to which lubricant must be delivered at specific maintenance intervals.

Machine tools of this kind are commonly known from the related art.

2. Related Prior Art

Ten or more lubrication points, which are often arranged at very inaccessible points, are frequently present on a machine tool of this kind. These lubrication points are used, for example, to lubricate the linear guides of the spindle head in the X, Y, and Z directions. Maintenance personnel must therefore be able to access all the lubrication points.

For maintenance lubrication of this kind, the machine tool must be shut down and the cover panels must be at least partially removed. Maintenance personnel must then "crawl into" the machine tool in a time-consuming and laborious manner in order to reach all the lubrication points, where as a rule lubrication nipples are present that allow lubrication by means of a suitable grease gun.

In the case of machine tools of this kind with decentralized manual lubrication, it is disadvantageous that the machine tool is inactive for a long period during these maintenance operations, so that these inactive times lead to production outages. It is also disadvantageous that the activity of the maintenance personnel is not only laborious but often also dangerous, since the often oil-covered machine tools have sharp edges on which maintenance personnel can sustain injury.

SUMMARY OF THE INVENTION

In view of the above, it is an object of the present invention to improve the machine tool cited at the outset in such a way that lubrication is simplified and requires little time on the part of maintenance personnel, the design being intended to be simple and economical.

According to the invention this object is achieved, in the case of the machine tool mentioned at the outset, by the fact that at least some of the lubrication points are connected, via a system of lubricant lines, to a central delivery station for lubricant.

The object underlying the invention is completely achieved in this manner. Specifically, the individual lubrication points are now supplied from the delivery station via, for example, a star-shaped network of lubricant lines, so that for maintenance lubrication, personnel must access only a single point on the machine tool, namely the place where the delivery station is arranged. The individual lubrication points can be located far away from the delivery station, since the lubricant is conveyed via the lubricant lines to the individual lubrication points. Lubricant pumps, for example, which ensure transport of the lubricant to the lubrication points, can be provided at the central delivery station.

It is preferred, however, if a filler block for manual lubrication is provided at the delivery station.

The advantage here is that the individual lubricant lines can, for example, terminate in lubrication nipples located next to one another on the filler block, so that maintenance personnel can fill these lubrication nipples in succession with a grease gun.

In a development, however, it is preferred if one lubricant line proceeds from the filler block and then branches out to the lubrication points.

The advantage here is that a "tree-like" structure of lubricant lines is made available, so that maintenance personnel needs to inject grease into the system of lubricant lines at only a single lubrication point. This again greatly simplifies lubrication, thus also further reducing the time that must be spent.

A further advantage of this tree structure lies in the fact that because of the branching, the total length of the lubricant lines is greatly reduced as compared to the star-shaped network.

It is preferred in this context if the filler block has one inlet for maintenance lubrication and one inlet for rapid filling of the system of lubricant lines.

The advantage of this feature is that openings are provided on one and the same part for two different actions, namely one for ordinary maintenance and a further one by means of which the system of lubricant lines can be rapidly filled with lubricant prior to initial startup or after major repairs or replacement operations.

It is preferred in this context if the filler block has a lubricant conduit to which the outgoing lubricant line is connected, as well as at least two orifices that open into the sides of the lubricant conduit, the first orifice being equipped with a lubrication nipple and the second orifice with a removable cap.

The design advantage of this feature is that the two inlets for maintenance and rapid filling are provided in parallel in the simplest possible manner. All that is now required for rapid filling is to remove the cap of the one orifice, whereupon large quantities of lubricant can then be introduced into said orifice, but because of the nonreturn effect cannot emerge from the lubrication nipple. During maintenance, this opening for rapid filling is sealed off by the cap so that grease can now be injected into the lubricant conduit via the lubrication nipple.

The system described so far thus makes possible, at a central delivery station, the delivery of lubricant which is then distributed via the system of lubricant lines to the individual lubrication points. A very economical and easy-to-operate manual central lubrication system has, in this respect, thus been created. This system has the disadvantage, however, that the quantity of lubricant arriving at the individual lubrication points depends on the respective lengths of the lubricant lines, on their path (which in some cases is highly curved), and on a possible counterpressure arising at the lubrication point.

In order to eliminate this problem, it is preferred if at least some of the lubrication points are connected via the lubrication lines to outlets of at least one dosing or metering element that dispenses lubricant arriving at its inlet to its multiple outlets in predetermined quantities.

The advantage here is that these metering elements ensure that defined quantities of lubricant are dispensed to the lubrication points, with no need for quantitative regulation of the delivery of lubricant to the inlets of the metering elements. Maintenance personnel can thus, for example, use a grease gun to inject lubricant into lubricant lines leading to the inlets of the metering elements, whereupon the metering elements then dispense predefined quantities of lubricant to the lubrication points.

Metering elements of this kind can be, for example, electrically or pneumatically driven volumetric or mass distributors, pumps, etc.

In an embodiment, however, it is preferred if the metering element is a volumetric distributor actuated by the delivery pressure of the lubricant itself.

The advantage here is that no outside energy is required in order to control the metering element. Volumetric distributors of this kind are known per se; they are referred to, for example, as progressive distributors, and used in centralized lubrication systems in which predefined quantities of lubricant are delivered to them via pumps. The inventors of the present application have now recognized, however, that it is also possible, surprisingly, to use metering elements of this kind in a manual centralized lubrication system as described above, although because of the manual lubrication the lubricant pressure, and the respective quantity of lubricant injected, vary greatly.

In a development, it is preferred if multiple metering elements of this kind are provided, and are cascaded in such a way that one metering element acting as the main distributor is connected at its outlets to inlets of metering elements acting as subsidiary distributors.

This results in a simple tree structure, since the main distributor conveys predefined quantities of lubricant not directly to the lubrication points but to further metering elements which then in turn dispense the incoming lubricant in predefined quantities to the lubrication points. This cascade capability of manually supplied metering elements of this kind represents a further surprising realization by the inventors of the present application, since it was not to be expected that despite the manual delivery of lubricant, this branched dispensing of lubricant would be possible in as reproducible a fashion as has been shown in the case of a test configuration of the centralized lubrication system according to the invention.

It is further preferred in this context if the main distributor is connected at its inlet to the filler block, and is arranged at a distance from the latter.

The design advantage of this feature is that the main distributor can be arranged in the interior of the machine tool in the vicinity of the subsidiary distributors, so that the lubricant lines between the main distributor and the subsidiary distributors can be very short. Only one longer line is necessary, via which the main distributor is connected to the central delivery station, i.e. to the filler block arranged there.

It is further preferred if monitoring elements that are connected to a central sequence controller of the machine tool are arranged on some metering elements.

This advantageously allows for lubrication monitoring, which increases the operating reliability of the machine tool. The reason is that the monitoring elements can now be interrogated by the central sequence controller as to whether each individual metering element has in fact dispensed lubricant. Since, in the case of manual lubrication, larger quantities of lubricant must now be injected into the system of lubricant lines, these monitoring elements can further be utilized to generate an indicating signal which indicates to maintenance personnel that all the metering elements have now actuated, i.e. that all the lubrication points have been lubricated.

In a simple embodiment, these monitoring elements can also be omitted; maintenance personnel must now simply inject a predefined quantity of lubricant into the system. In the case of the test configuration mentioned earlier, for example, an initial filling of approx. 1000 cm$^3$ resulted; according to the maintenance schedule, 60 cm$^3$ needs to be added to the new machine tool for lubrication every 2000 operating hours.

BRIEF DESCRIPTION OF THE DRAWINGS

Further advantages are evident from the description and the attached drawings.

It is understood that the features mentioned above and those yet to be explained below can be used not only in the respective combinations indicated, but also in other combinations or in isolation, without leaving the context of the present invention.

Figure 1:
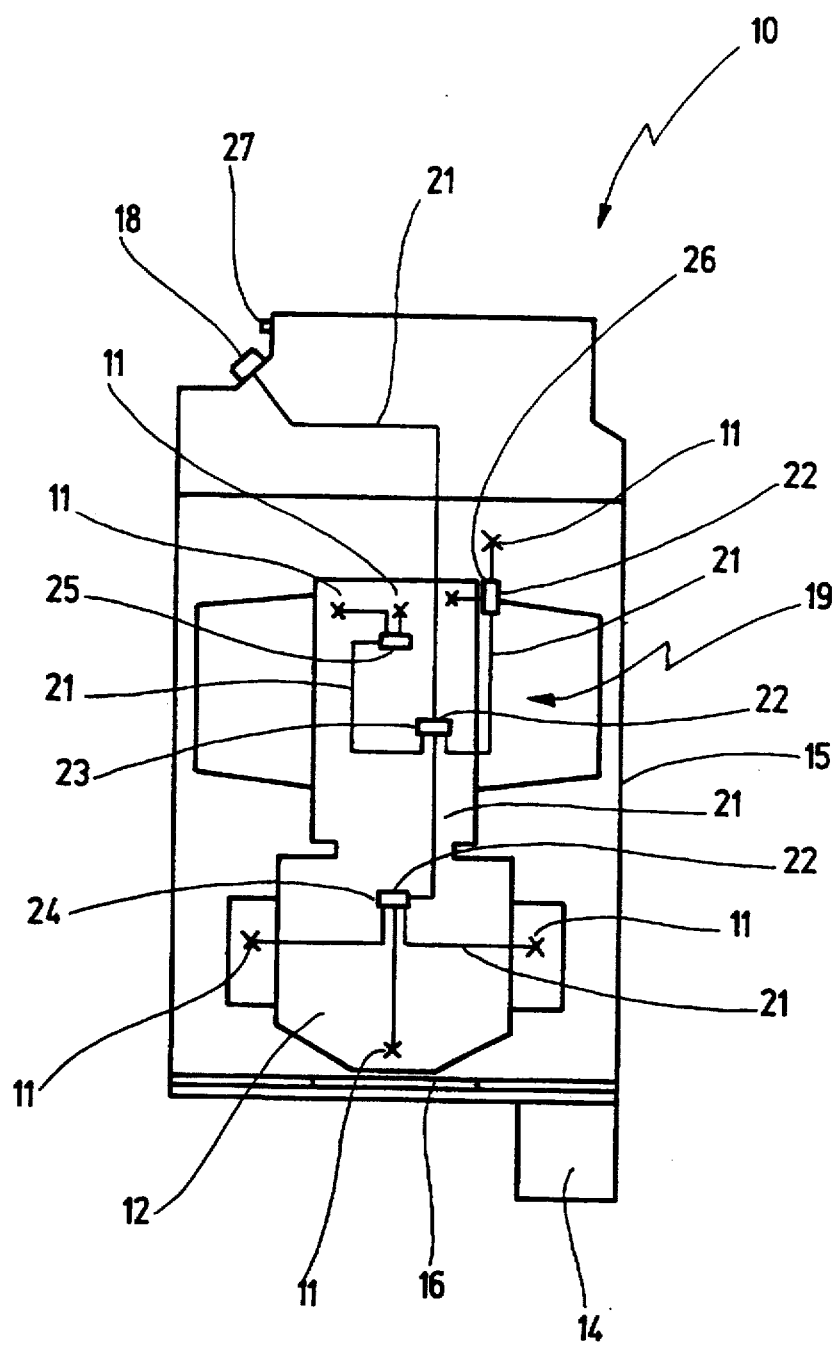

An embodiment of the invention is shown in the drawings and will be explained in more detail in the description below. In the drawings:

FIG. 1 shows a schematic plan view of the new machine tool; and

Figure 2:
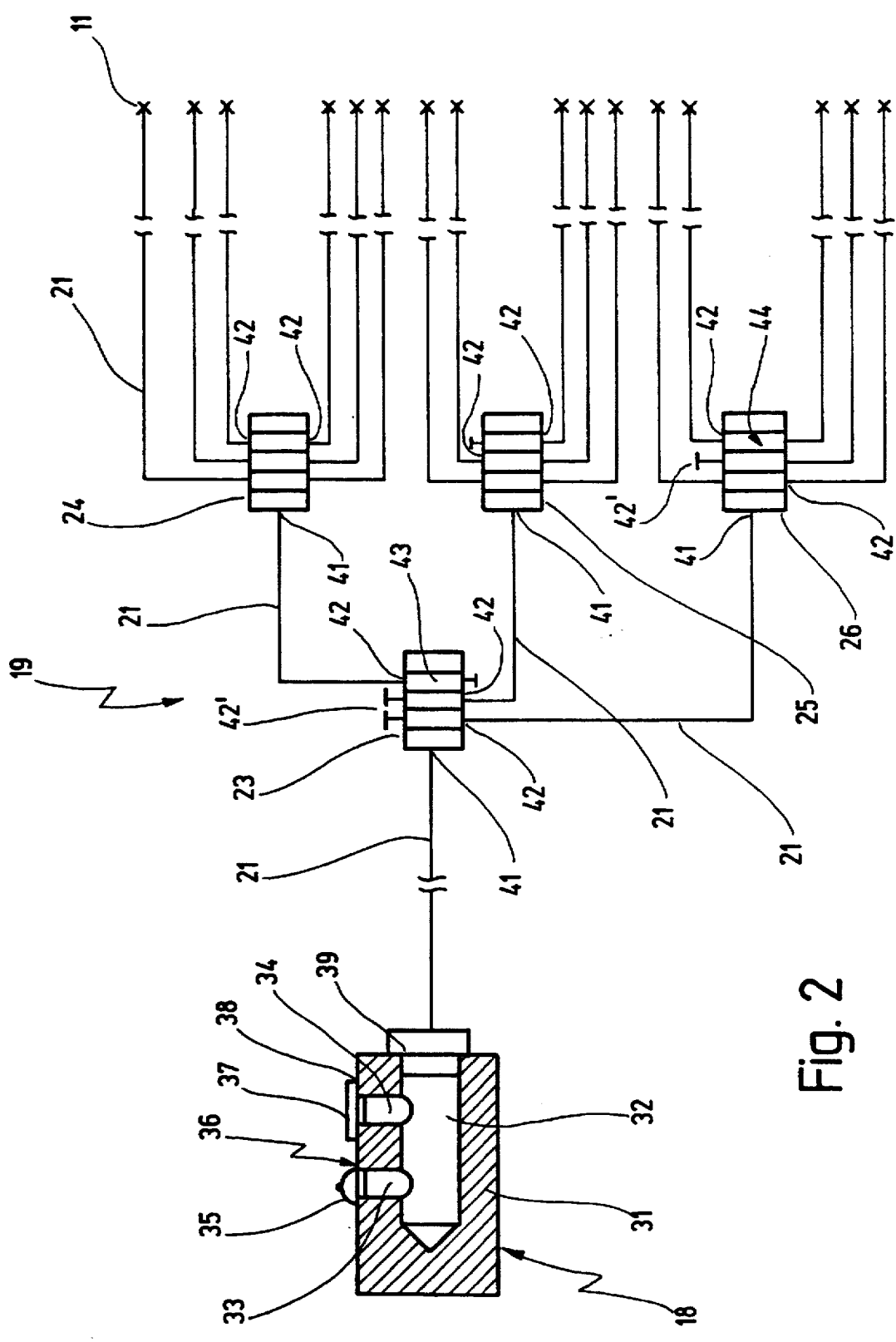

FIG. 2 shows the centralized lubrication system partly in section used in the new machine tool according to FIG. 1.

DESCRIPTION OF A PREFERRED EMBODIMENT

In FIG. 1, 10 designates a machine tool according to the invention provided with a plurality of lubrication points 11, indicated with crosses. Lubricant must be delivered to these lubrication points 11 at specific maintenance intervals.

Machine tool 10 is shown only schematically; it comprises a spindle head 12 displaceable in three axes, as well as a control console 14 arranged externally on a cover panel 15 of machine tool 10. In addition, a door 16 is provided in cover panel 15, through which tools and workpieces can be placed into and removed from the machine tool.

On the rear side remote from door 16, machine tool 10 has a central delivery station 18 for lubricant, connected to a centralized lubrication system 19. Centralized lubrication system 19 comprises a system of lubricant lines 21 which connect lubrication points 11 to central delivery station 18.

Lubricant lines 21 are interconnected via metering elements 22, one metering element 22, acting as main distributor 23, being connected directly to central delivery station 18. Three subsidiary distributors 24, 25, 26 are connected to the outlets of main distributor 23, and are in turn connected at their outlets to the individual lubrication points 11.

At the defined maintenance intervals or those indicated on control console 14, in the case of the new machine tool 10 maintenance personnel must now simply proceed to its rear side and there, at central delivery station 18, introduce the requisite quantity of lubricant into the centralized lubrication system. Once introduced, this lubricant then branches out via main distributor 23 and subsidiary distributors 24, 25, 26 to the individual lubrication points 11. When lubrication is complete, the maintenance person presses a reset button 27 arranged in the vicinity of central delivery station 18. A centralized sequence controller of machine tool 10 detects that reset button 27 has been pushed, and thereupon cancels the maintenance indication on control console 14.

FIG. 2 schematically depicts the centralized lubrication system for machine tool 10 of FIG. 1.

It is evident that central delivery station 18 comprises a filler block 31 in which a lubricant conduit 32 is provided. Two orifices 33 and 34 open into the side of lubricant conduit 32, orifice 33 having a lubrication nipple 35 on its inlet 36. Orifice 34 has a removable cap 37 on its inlet 38. Lubricant conduit 32 is connected via a reducer piece 39 to a lubricant line 21.

Inlet 36 on filler block 31 is used for ordinary maintenance lubrication, in which lubricant passes via a grease gun through lubrication nipple 35 into lubricant conduit 32.

Since inlet 38 is sealed off by cap 37, this lubricant is forced out of lubricant conduit 32 into lubricant line 21.

During final assembly of the new machine tool 10, or after major repair operations, centralized lubrication system 19 can be rapidly loaded with lubricant via large inlet 38, after removing cap 37. All that is necessary for this is to remove cap 37; lubrication nipple 35 can, because of its nonreturn effect, remain in orifice 33, which is sealed by it.

Each of metering elements 22, which act as main distributor 23 and subsidiary distributors 24, 25, 26, has one inlet 41 and multiple outlets 42. Lubricant delivered to inlet 41 is distributed successively and in predefined quantities, solely by means of the pressure of the delivered lubricant 41, to outlets 42. Metering elements 22 in FIG. 2 comprise all three blocks 43, each of which has two outlets 42, 42'. It is also possible, however, to close off one of the outlets, as indicated at 42", as a result of which double the quantity of lubricant is then dispensed at the open outlet 42. To supply subsidiary distributors 24, 25, 26, every second outlet 42' is closed on the main distributor so that reliable operation is possible.

Metering elements of this kind are known per se for pump-controlled centralized lubrication systems, and are called, for example, progressive distributors. One progressive distributor of this kind is the Vogel VPB progressive distributor that can be obtained by Willy Vogel AG, Motzener StraBe 35/37, 12277 Berlin 48.

In progressive distributors of this kind, a double piston is present in each of the blocks located next to one another, the double piston chambers being in each case interconnected via conduits in such a way that the pistons lock one another in their corresponding end positions. A lubricant pressure now moves only one piston in each case, which expels a specific quantity of lubricant and, at the end of its stroke movement, then opens or closes conduits so that now the next piston is moved by the lubricant pressure at the inlet of the metering element. In other words, the lubricant pressure present at the inlet moves one piston after another, each piston movement causing a specific quantity of lubricant to be dispensed via one of the outlets of metering element 22.

FIG. 2 further indicates, at 44, a monitoring element which detects the movement of a piston in a block 43 and reports it to a central sequence controller. Based on this message the central sequence controller detects whether the corresponding metering element 22 has performed a piston stroke, and whether lubricant has therefore been dispensed. This makes possible complete monitoring of central lubrication system 19.

Returning to FIG. 1, it should also be noted that main distributor 23 is arranged in the vicinity of subsidiary distributors 24, 25, 26, so that lubricant lines 21 connecting these distributors can be relatively short. Only one longer lubricant line 21 is required, connecting inlet 41 of main distributor 23 to filler block 31. During maintenance lubrication, lubricant is now manually injected via lubrication nipple 35 into lubricant conduit 32, whereupon main distributor 23 then distributes the lubricant arriving at its inlet 41 via its three blocks 43 to subsidiary distributors 24, 25, 26 in equal quantities. Subsidiary distributors 24, 25, 26 then cycle their blocks 43 in sequence, thereby dispensing lubricant via lubricant lines 21 to lubrication points 11. The individual distributors 23, 24, 25, and 26 operate solely by way of the lubricant pressure that is created manually upon injection of lubricant through lubrication nipple 35; an outside energy supply is not necessary, and pumps to convey the lubricant have also been made superfluous.

We claim:

1. A machine tool with a plurality of lubrication points to which lubricant must be delivered at specific maintenance intervals, wherein at least some of the lubrication points are connected, via a system of lubricant lines, to a central delivery station for lubricant, a filler block for manual lubrication is provided at the delivery station, one lubricant line proceeds from the filler block and then branches out to the lubrication points, and the filler block has one inlet for maintenance lubrication and one inlet for rapid filling of the system of lubricant lines.

2. The machine tool of claim 1, wherein the filler block has a lubricant conduit to which the outgoing lubricant line is connected, as well as at least two orifices that open into the sides of the lubricant conduit, the first orifice being equipped with a lubrication nipple and the second orifice with a removable cap.

3. The machine tool of claim 1, wherein at least some of the lubrication points are connected via the lubrication lines to outlets of at least one metering element that dispenses lubricant arriving at its inlet to its multiple outlets in predetermined quantities.

4. The machine tool of claim 3, wherein the metering element is a volumetric distributor actuated by the delivery pressure of the lubricant.

5. The machine tool of claim 4, wherein multiple metering elements are provided and are cascaded in such a way that one metering element acting as the main distributor is connected at its outlets to inlets of metering elements acting as subsidiary distributors.

6. The machine tool of claim 1, wherein at least some of the lubrication points are connected via the lubrication lines to outlets of at least one metering element that dispenses lubricant arriving at its inlet to its multiple outlets in predetermined quantities.

7. The machine tool of claim 6, wherein multiple metering elements are provided and are cascaded in such a way that one metering element acting as the main distributor is connected at its outlets to inlets of metering elements acting as subsidiary distributors.

8. The machine tool of claim 7, wherein the main distributor is connected at its inlet to the filler block, and is arranged at a distance from the latter.

9. The machine tool of claim 3, wherein monitoring elements that are connected to a central sequence controller of the machine tool are arranged on some metering elements.

* * * * *

UNITED STATES PATENT AND TRADEMARK OFFICE
CERTIFICATE OF CORRECTION

PATENT NO. : 5,799,751
DATED : September 1, 1998
INVENTOR(S) : Hans Henning Winkler, Karl Deufel It is certified that error appears in the above-identified patent and that said Letters Patent is hereby corrected as shown below:

On Page One, delete Priority Number " 196 87 783.4" and insert 196 07 783.4

Signed and Sealed this

Fifteenth Day of December, 1998

Attest:

BRUCE LEHMAN

Attesting Officer   Commissioner of Patents and Trademarks